(12) United States Patent
Govindarajan et al.

(10) Patent No.: US 11,940,909 B2
(45) Date of Patent: Mar. 26, 2024

(54) DYNAMIC MAPPING OF DATA TO LOWER LATENCY MEMORY BASED ON DATA ACCESS

(71) Applicant: TEXAS INSTRUMENTS INCORPORATED, Dallas, TX (US)

(72) Inventors: Sriramakrishan Govindarajan, Bengaluru (IN); Mihir Narendra Mody, Bengaluru (IN); Prithvi Shankar Yeyyadi Anantha, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/729,252

(22) Filed: Apr. 26, 2022

(65) Prior Publication Data

US 2023/0342292 A1 Oct. 26, 2023

(51) Int. Cl.
*G06F 12/02* (2006.01)
(52) U.S. Cl.
CPC .. *G06F 12/0246* (2013.01); *G06F 2212/7201* (2013.01)

(58) Field of Classification Search
CPC .............. G06F 12/0246; G06F 2212/7201
See application file for complete search history.

(56) References Cited

U.S. PATENT DOCUMENTS

| | | | |
|---|---|---|---|
| 2018/0173626 A1* | 6/2018 | Banerjee | G06F 12/0811 |
| 2021/0075633 A1* | 3/2021 | Sen | H04L 45/74 |
| 2021/0294695 A1* | 9/2021 | Li | G06F 11/3037 |
| 2022/0114096 A1* | 4/2022 | Striramassarma | G06F 9/5077 |
| 2022/0261178 A1* | 8/2022 | He | G06F 12/1027 |
| 2023/0065546 A1* | 3/2023 | Ibrahim | G06F 16/24552 |
| 2023/0107660 A1* | 4/2023 | Rushing | G06F 12/1027 |
| | | | 711/118 |

* cited by examiner

*Primary Examiner* — Tasnima Matin
(74) *Attorney, Agent, or Firm* — Michael T. Gabrik; Frank D. Cimino

(57) ABSTRACT

An Adaptive Memory Mirroring Performance Accelerator (AMMPA) includes a centralized transaction handling block that dynamically maps the most frequently accessed memory regions into faster access memory. The technique creates shadow copies of the most frequently accessed memory regions in memory devices associated with lower latency. The regions for which shadow copies are provided are updated dynamically based on use, and the technique flexible for different memory hierarchies.

19 Claims, 6 Drawing Sheets

DYNAMIC MAPPING OF DATA TO LOWER LATENCY MEMORY BASED ON DATA ACCESS

BACKGROUND

Processing data or computer code involves a processor reading code or data from a memory. In many cases, the data read by the processor must be copied into a short-term memory, such as random access memory (RAM), from which the processor is able to read and execute. Another technique for processing data includes utilizing an execute in place (XIP) technique in which the data and/or code is stored in non-volatile storage, such as Flash memory. The benefit of using XIP-capable Flash memory is that data does not have to be copied to the RAM, and typically much more memory is available in non-volatile storage than in RAM. However, one disadvantage of an XIP-capable Flash memory is that Flash memory is typically associated with greater latency than a smaller RAM.

Some techniques have been implemented to utilize a pre-fetcher block between the processor cache and the stored data/code, such as the XIP-capable Flash memory, wherein the pre-fetcher logic speculatively pre-fetches a next few blocks of data and stores the data in a pre-fetch buffer, thereby moving the data closer to the processor cache. However, the pre-fetch buffer may not scale for multi-processor use and may be inefficient for reading from Flash memory.

SUMMARY

Processing data or computer code involves a processor reading code or data from a memory. This disclosure relates to an adaptive performance accelerator integrated circuit (IC). The IC includes a transaction tracker configured to maintain a location mapping for each of a plurality of memory blocks, wherein the location mapping references at least one of a first of a hierarchical set of memory devices, and a second memory of the hierarchical set of memory devices, wherein the first memory is configured to store a mirrored copy of one or more portions of data stored at the second memory for which an access threshold is satisfied. The IC also includes a transaction mapper configured to receive a request from a processor core for access to a first memory block of the plurality of memory blocks, obtain, from the transaction tracker, a mapped address for the first memory block, and remap the request to the mapped address.

This disclosure also relates to a system-on-chip comprising one or more compute cores, a first memory configured to store mirrored copies of content from a second memory, and an accelerator block. The accelerator block is configured to track an access frequency for each of a plurality of memory blocks on a second first memory with higher latency than the first memory, determine that the access frequency for a first memory block of the plurality of memory blocks satisfies an access threshold, and responsive to determining that the access frequency for the first memory block satisfies the access threshold, initiate DMA mirroring of the first memory block from the second memory to the first memory. The SOC also includes a transaction tracker configured to maintain a location mapping for each of a plurality of memory blocks, wherein the location mapping comprises references to the first memory and the second memory.

This disclosure also relates to a method comprising receiving, from a processor core on an integrated circuit (IC), a read request for a first memory block at a first address on a first memory with higher latency than a second memory, determining a mapped destination address for the first memory block, wherein the mapped destination address is located on the second memory, wherein the second memory is configured to store one or more portions of data stored at the first memory for which an access threshold is satisfied, and initiating the read request to the remapped destination.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

Figure 1:
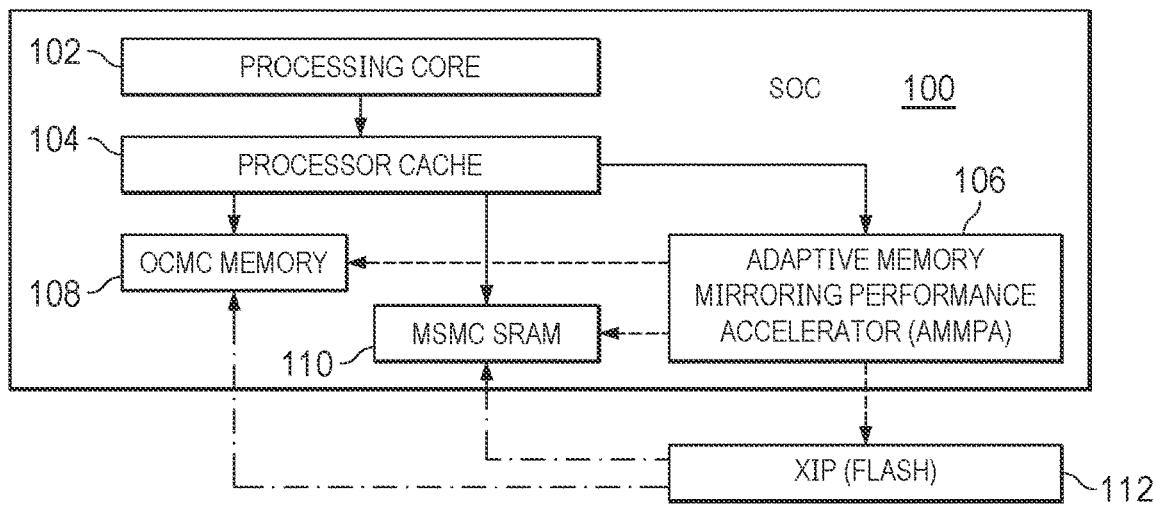
FIG. 1 illustrates an example system diagram of a hierarchical memory architecture in which various embodiments of this disclosure are implemented.

A technique is provided to include a specialized accelerator configured to utilize the hierarchical nature of memory devices utilized by a processor to improve the performance of read-only access of code and/or data from a higher latency memory location across the hierarchy. Memory accessible by the processor may be implemented in a hierarchical structure, where memory closer to the processor can be read with less latency than memory farther from the processor. By providing a flexible and intelligent mirroring technique, read requests can be optimized by mirroring the most frequently accessed code and/or data in lower latency memory locations. For purposes of clarity, this disclosure may refer to code being stored and mirrored. However, it should be understood that the technique applies to any non-writeable information such as computer code or read-only data.

According to some embodiments, performance may be improved by utilizing memory associated with lower latencies for portions of code which are most frequently read. To implement the mirroring technique in a manner that is transparent to a user (e.g., does not require pre-defining most frequently accessed memory blocks), a specialized hardware accelerator may be deployed to manage a data/code tracking and mirroring process. An Adaptive Memory Mirroring Performance Accelerator (AMMPA) may include a centralized transaction handling block that dynamically maps the most frequently accessed memory regions into faster access memory. The technique creates shadow copies of the most frequently accessed memory regions and is flexible for different memory hierarchies. In addition, the technique works with one or more configurable regions of faster memory.

In general, the AMMPA may be a memory controller integrated circuit configured to dynamically track access patterns for code and/or data stored in a memory location, such as an XIP-enabled Flash memory or other higher-latency memory among a memory hierarchy, to detect "hot spots." Upon determining that a particular portion of data satisfies an access threshold, which may be dynamically modified based on access patterns, the particular portion of data is mirrored to a shadow region allocated on memory with less latency than the target memory. The AMMPA can intercept transaction requests directed to the target memory and remap the transaction requests directed to the shadow copy location. Accordingly, this on-the-fly remapping is transparent to the user and the code running on the processor is processed under the assumption that it is accessing content from the target memory.

According to some embodiments, a system is provided that includes an accelerator block that efficiently (on-the-fly) maps more frequently accessed memory regions to limited faster access memory. One or more compute cores may access/execute content from slower access memory. The system may also include one or more fast access on-chip memory regions as backing data memory. The backing data memory may be configured to hold shadow copy of frequently accessed content from slower memory. The system may include an AMMPA hardware block that acts as a proxy for accesses to the slower access memory regions.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C, if intervening component C does not alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Modifications are possible in the described embodiments, and other embodiments are possible, within the scope of the claims.

FIG. 1 illustrates an example system diagram of a hierarchical memory architecture in which various embodiments of this disclosure are implemented. The example system includes a system-on-chip (SOC) 100 coupled to a target memory 112, such as Flash memory. According to some embodiments, the SOC 100 may include a processing core 102. The processing core 102 may be part of a processor such as a central processing unit (CPU) or a microprocessor. Target memory 112 may be XIP-enabled non-transitory memory and may store instructions for execution by the processing core 102, or may be another memory type for which lower latency memories are available in the memory hierarchy.

The instructions executed by the processing core 102, which may include a single core or multiple cores, are parts of one or more software programs. Software programs may be developed, encoded, and compiled in a variety of computing languages for a variety of software platforms and/or operating systems and subsequently loaded and executed by processing core 102. In some embodiments, the compiling process of the software program may transform program code written in a programming language to another computer language such that the processor 102 is able to execute the programming code. For example, the compiling process of the software program may generate an executable program that provides encoded instructions (e.g., machine code instructions) for processor 102 to accomplish specific, non-generic, particular computing functions. The encoded instructions may be loaded as computer executable instructions or process steps to processor 102 from a memory external to the SOC 100, such as target memory 112, and/or a memory embedded within a same subsystem as processing core 102 (e.g., processor cache 104, on-chip memory controller (OCMC) 108, and multicore shared memory controller (MSMC) SRAM 110).

The SoC 100 can also include an Adaptive Memory Mirroring Performance Accelerator (AMMPA) 106. Generally, the AMMPA 106 is a functional block that acts as a proxy for requests from the processing core 102 to regions of memory, such as target memory 112 or the like. According to some embodiments, the AMMPA 106 includes one or more counters to track calls to various memory locations of the target memory 112. In some embodiments, a counter may be provided for each memory region, or slice, that is tracked. Similar to, but distinct from the caches of the processor cache 104, the AMMPA 106 may copy code from a slower memory to a faster memory. However, in contrast to the processor cache 104, the AMMPA may store the copied data in a number of different types of memory scattered about the SoC 100, and also selectively mirrors code based on tracked usage statistics for memory blocks in the system. That is, the AMMPA 106 is configured to intercept and redirect memory calls, and also maintain and selectively mirror memory blocks from memory devices throughout a system, such as on a same SOC as the AMMPA 106, on memory external to the AMMPA, and the like. In some embodiments, the AMMPA 106 may include logic which causes portions of the computer code stored in memory blocks of target memory 112 considered to be "hot spots" to be copied to other memory locations on memory devices associated with lower latency, such as OCMC memory 108, or MSMC SRAM 110. The AMMPA may identify the "hot spots" among the tracked memory by implementing logic to track access pattern and implement a state machine for determination of hot spots based on the tracking and for mirroring code blocks from the hot spots. In addition, AMMPA 106 is configured to store a table of mapped memory locations when portions of the code are copied from target memory 112 onto other memory locations. Accordingly, when the processing core 102 provides a transaction directed to a memory location on the target memory, the AMMPA 106 can intercept the transaction, determine whether the code associated with the memory location has been mirrored to another, closer memory location, and if so, remap the transaction address. For example, if a particular line of code has been mirrored to an on-chip memory location, the AMMPA 106 can remap the location and cause the transaction to be performed with the on-chip memory location, thereby circumventing longer latency associated with calls to the target memory 112.

Figure 2:
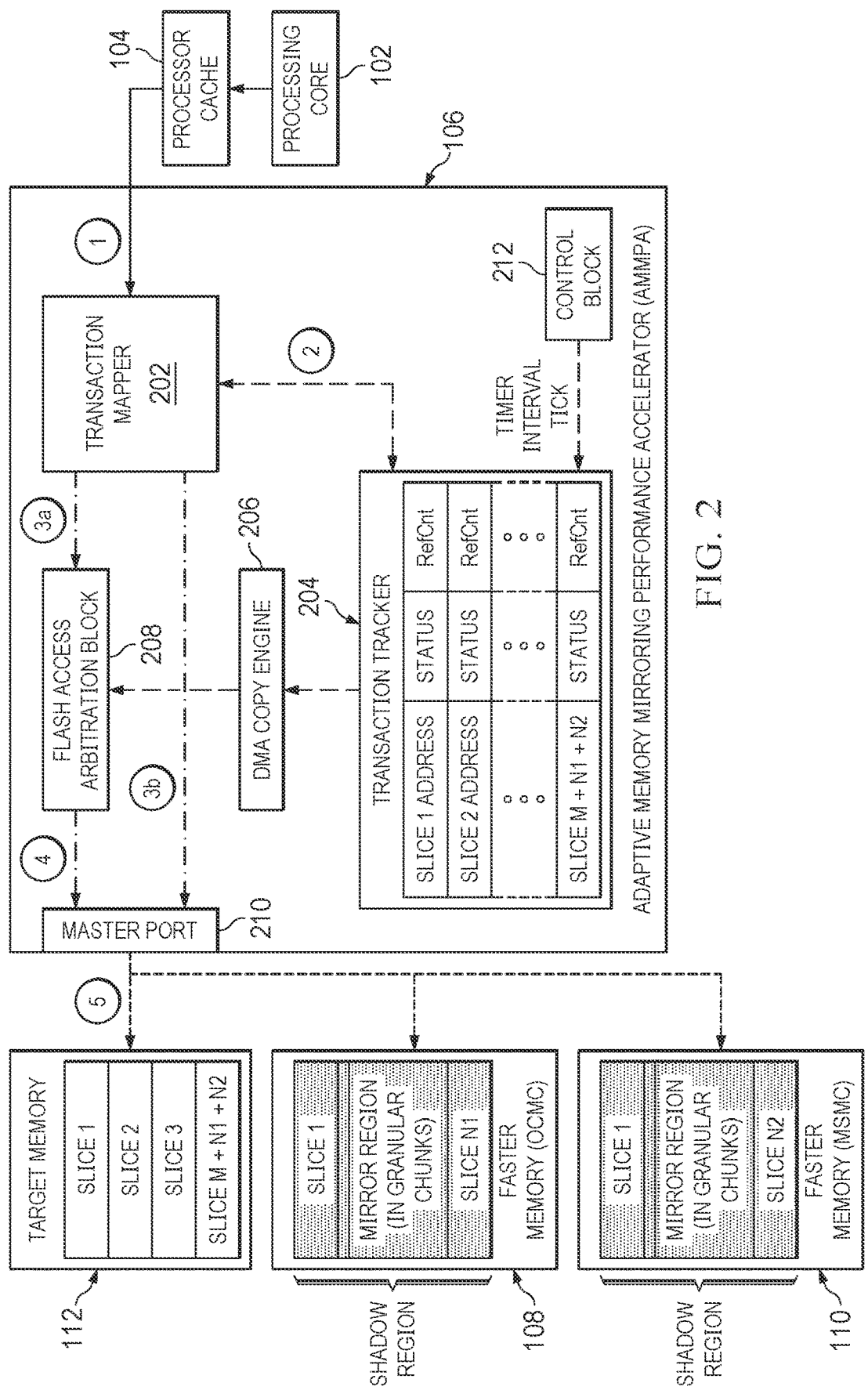
FIG. 2 illustrates a flow diagram illustrating a technique for improving XIP performance, according to some embodiments.

FIG. 2 illustrates a flow diagram illustrating a technique for improving processor performance, according to some embodiments. The flow diagram includes a processing core 102 sending transactions to read from target memory 112 by way of processor cache 104, which are being intercepted by AMMPA 106, and potentially redirected to additional memory devices, such as OCMC 108 or MSMC 110 if the target data is mirrored to a mirrored target memory location. Otherwise, the read request is passed through to the target memory.

According to some embodiments, AMMPA 106 includes a transaction mapper 202 which is configured to act as a proxy target. Transaction mapper 202 may intercept transactions from the processing core 102 and regenerate the transactions with mapped addresses when the code at the target address has been mirrored to another memory location. In some embodiments, transaction mapper 202 may intercept transactions from multiple processing cores 102. In one embodiment, the transaction tracker includes a combination of one or more logic gates, flip-flops, registers, counters, and the like. Transaction tracker 204 is configured to manage various code portions based on memory locations at the target memory 112. In some embodiments, transaction tracker 204 tracks a tracking status for each memory block and tracks a count for calls to each of the memory locations. In some embodiments, the status is tracked for a memory block which may be of a larger size than the read request. As such, the tracked memory block for the particular read request will be identified. Transaction tracker 204 may also include a decision engine for determining when to mirror a particular portion of code based on an access frequency. In some embodiments, the tracked values may be weighted toward more recent access requests. For example, transaction tracker may occasionally or periodically age the access frequency value. For example, the frequency value may be downsampled or otherwise reduced to give greater weight to recent access requests.

Control block 212 may provide a system clock to indicate to the transaction tracker 204 when an access frequency should be aged. In some embodiments, the control block 212 includes reset logic to restart transaction tracking. The DMA copy engine 206 may be configured to implement the mirroring of code from the target memory 112 to faster memory, such as OCMC 108 or MSMC 110 in the case that target memory 112 is Flash memory. The DMA copy engine 206 also notifies the transaction tracker 204 when mirroring is complete such that the transaction tracker 204 can update a status of a particular memory block. Flash arbitration block 208 schedules access to the target memory 112. For example, processing core 102 may make call requests to the target memory 112 at the same time that transaction tracker 204 causes the DMA copy engine 206 to mirror data from the target memory 112 to faster memory, such as OCMC 108 or MSMC 110. The flash arbitration block 208 therefore receives requests for transactions for non-shadowed memory regions. The flash arbitration block 208 prioritizes transactions from the processor core 102 over background DMA transfers, according to some embodiments.

According to some embodiments, the transaction handling sequence includes the processing core 102 executing code stored on the XIP flash 112. Access to the XIP flash 112 is proxied through the AMMPA 106. As such, the transaction is intercepted by the AMMPA 106. The transaction mapper 202 of the AMMPA forwards the request to the transaction tracker 204. The transaction tracker 204 performs a lookup for a status of a target address for the transaction at the target memory 112. According to some embodiments, the status for a particular memory block may include, for example, tracked memory locations (e.g., memory locations for which a shadow copy is not available on another memory device, such as a memory device for which access would be faster), backed memory locations (e.g., memory locations for which a shadow copy is available on another memory device) and in transition (e.g., memory locations for which in the process of being copied to a shadow region of a faster memory device). If the transaction tracker 204 determines that the target memory location is backed at an alternative, faster memory, then the transaction tracker 204 returns the address for the shadow memory region to the transaction mapper 202, such as a particular memory location in faster memory OCMC 108 or faster memory MSMC 110. If the transaction tracker 204 determines that the target memory location is not backed at an alternative, faster memory, for example, if a status for the requested memory block is tracked or in transition, then the transaction tracker 204 indicates to the transaction mapper 202 that the memory location in target memory 112 should be used. In some embodiments, if the transaction tracker 204 returns an address for a mirror region, then transaction mapper 202 can initiate the transaction with the remapped destination through the master port 210. If the transaction tracker 204 indicates to the transaction mapper 202 that the target memory 112 location should be used, then the transaction mapper 202 initiates the transaction through the flash access arbitration block 208. The flash access arbitration block 208 can then prioritize transactions originating from the processing core 102 over transactions from the DMA copy engine 206. According to some embodiments, by prioritizing transactions originating from the processing core 102 over transactions from the DMA copy engine 206, the latency associated with the transaction remains reduced, as the processing core 102 does not have to wait for ongoing background DMA transfers.

In some embodiments, while the AMMPA 106 is managing transactions from the processing core 102, the AMMPA 106 may also dynamically modify which memory blocks from the target memory 112 are available in a shadow region of a faster memory, such as OCMC 108 or MSMC 110. According to some embodiments, management of the memory blocks of the target memory 112 may occur at the slice level. As such, OCMC may include N1 slices of mirrored memory blocks from the target memory 112. MSMC may include N2 slices of mirrored memory blocks from the target memory 112. The size of the shadow regions available by the OCMC and/or the MSMC may be preconfigured such that a portion of one or more of the memories is a dedicated shadow region. According to one or more embodiments, the number of slices N1 and N2 may be configurable, for example based on user input and/or for the amount of shadow memory available in the faster memory locations. Not all slices of target memory 112 may be mirrored in other memory locations. For example, M slices of the target memory 112 may not be mirrored and may only be located only on the target memory 112. As such, as shown, memory 112 includes M+N1+N2 slices. Further, not all slices of the target memory 112 may be tracked. Accordingly, target memory 112 may include N1 (shadowed) slices+N2 (shadowed) slices+M (only tracked, no shadow copy) slices+additional untracked slices. According to some embodiments, the untracked memory slices may be available for access by the processor core without the AMMPA 106 intercepting the request.

In some embodiments, the transaction tracker 204 tracks access requests for each memory location of the XIP flash 112. The access frequency may be incremented each time an access is detected for a particular memory location. In some embodiments, the access frequency is weighted toward more recent access requests. For example, the control block 212 can provide a clock which occasionally, or periodically, ages the access frequency score for the memory locations. If it is determined that the access frequency for a particular memory location satisfies a current access frequency threshold, then the transaction tracker 204 can trigger the DMA copy engine 206 to initiate a DMA transfer to copy the data from the particular memory location at the XIP flash 112 to a memory location in a shadow region in a faster memory, such as OCMC 108 or faster memory 110. The determination can occur in real time as access requests are received, or may occur in a deferred manner, such as periodically or occasionally. In some embodiments, the current access frequency threshold may be dynamically computed to adapt to memory constraints and read patterns. For example, a current access frequency threshold may be set as the lowest access frequency value among mirrored memory.

Figure 3:
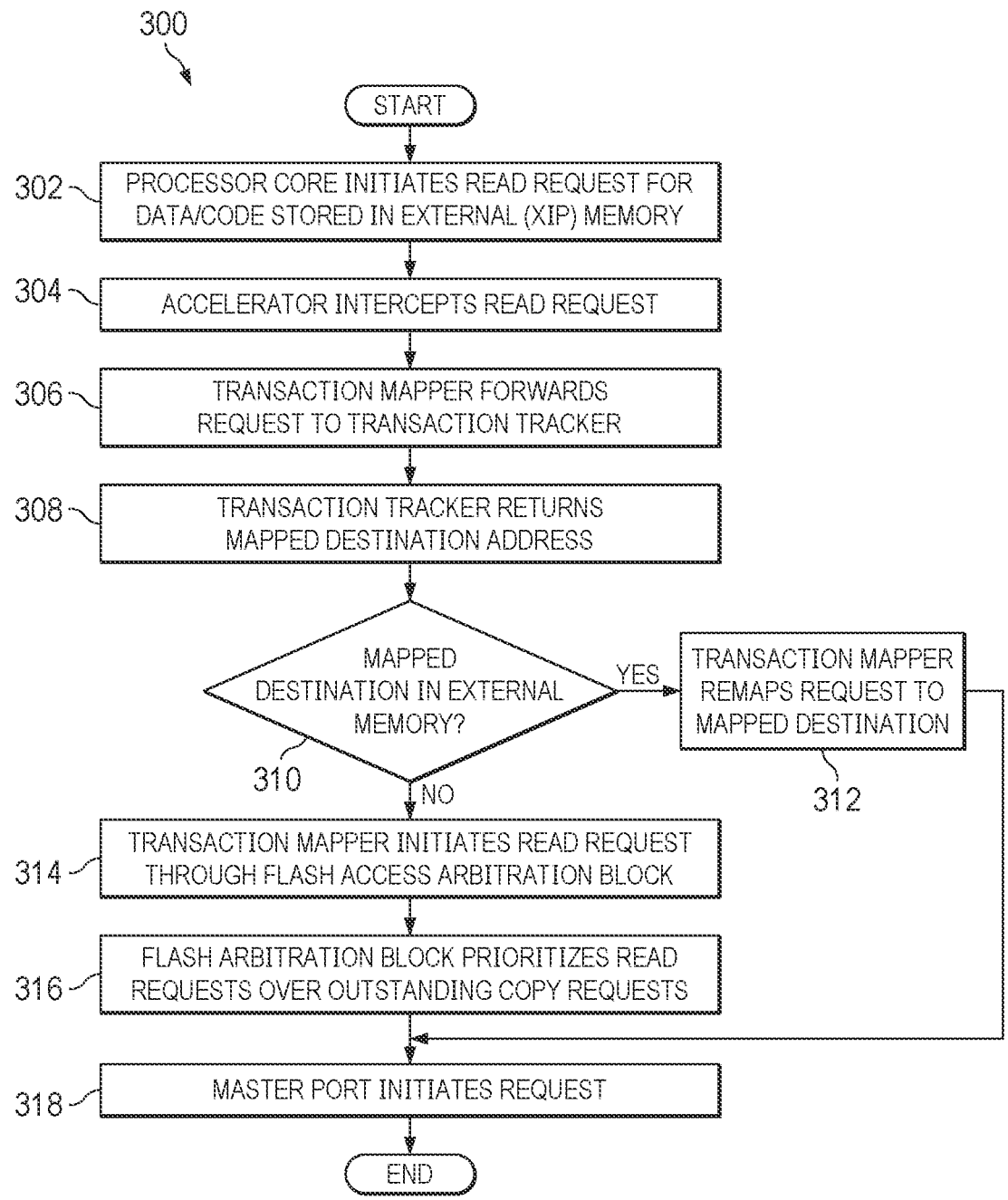
FIG. 3 illustrates a flowchart of a technique for improving XIP performance, according to some embodiments.

FIG. 3 illustrates a flowchart of a technique for improving XIP performance, according to some embodiments. Specifically, FIG. 3 depicts a technique for reducing latency associated with processing code from an XIP-enabled flash memory by utilizing shadow regions in memory devices associated with reduced latency, according to some embodiments. The flowchart depicts a series of steps in a particular order. However, it should be understood that the various steps may be performed in a different order. Further, in some embodiments additional steps may be included, or some of the steps may be omitted. In addition, some of the steps may be performed concurrently in some embodiments. For purposes of clarity, the various steps will be described with reference to the components of FIGS. 1-2. However, it should be understood that alternative components may be used in some embodiments.

The flowchart begins at block 302, where the processing core 102 initiates a transaction for computer code stored in an external XIP-enabled flash memory. Access to the XIP flash 112 is proxied through the AMMPA 106, which may be a hardware accelerator on a same integrated circuit as the processing core 102. In some embodiments, the AMMPA 106 may be communicably connected to multiple cores on the integrated circuit. As such, the transaction is intercepted by the AMMPA 106 at block 304.

The flowchart 300 continues at block 306, where transaction mapper 202 of the AMMPA 106 forwards the request to the transaction tracker 204. Then, at block 308, the transaction tracker 204 performs a lookup for a status of a target address for the transaction at the XIP Flash 112. If at block 310 the transaction tracker 204 determines that the target memory location is backed at an alternative, faster shadow memory region, then the flowchart 300 continues to block 312, and the transaction tracker 204 returns the address for the shadow memory region to the transaction mapper 202, such as a particular memory location in faster memory OCMC 108 or faster memory MSMC 110.

Alternatively, if at block 310 the transaction tracker 204 determines that the target memory location is not backed at an alternative, faster memory, then the flowchart continues to block 314 and the transaction tracker 204 indicates to the transaction mapper 202 that the XIP flash 112 memory location should be used. For example, the transaction tracker may return the address in the XIP flash 112. The flowchart continues to block 316 and the transaction mapper 202 initiates the transaction through the flash access arbitration block 208. The flash arbitration block 208 can then prioritize transactions originating from the processing core 102 over transactions from the DMA copy engine 206. The flowchart concludes at block 318, where the transaction process through to the determined destination through the master port 210.

According to some embodiments, the portions of the flash memory for which shadow copies are available in faster memory may change dynamically over time, based on historic frequency of calls to the various memory blocks. For example, the mix of applications that run on the processor may change in response to use case needs. As such, the memory blocks on the Flash memory that are determined to be "hotspots" remain up-to-date, without user interference. Accordingly, it is not necessary to pre-program the frequently accessed memory blocks to be stored in faster memory than the Flash memory, such as on-chip memory.

Figure 4:
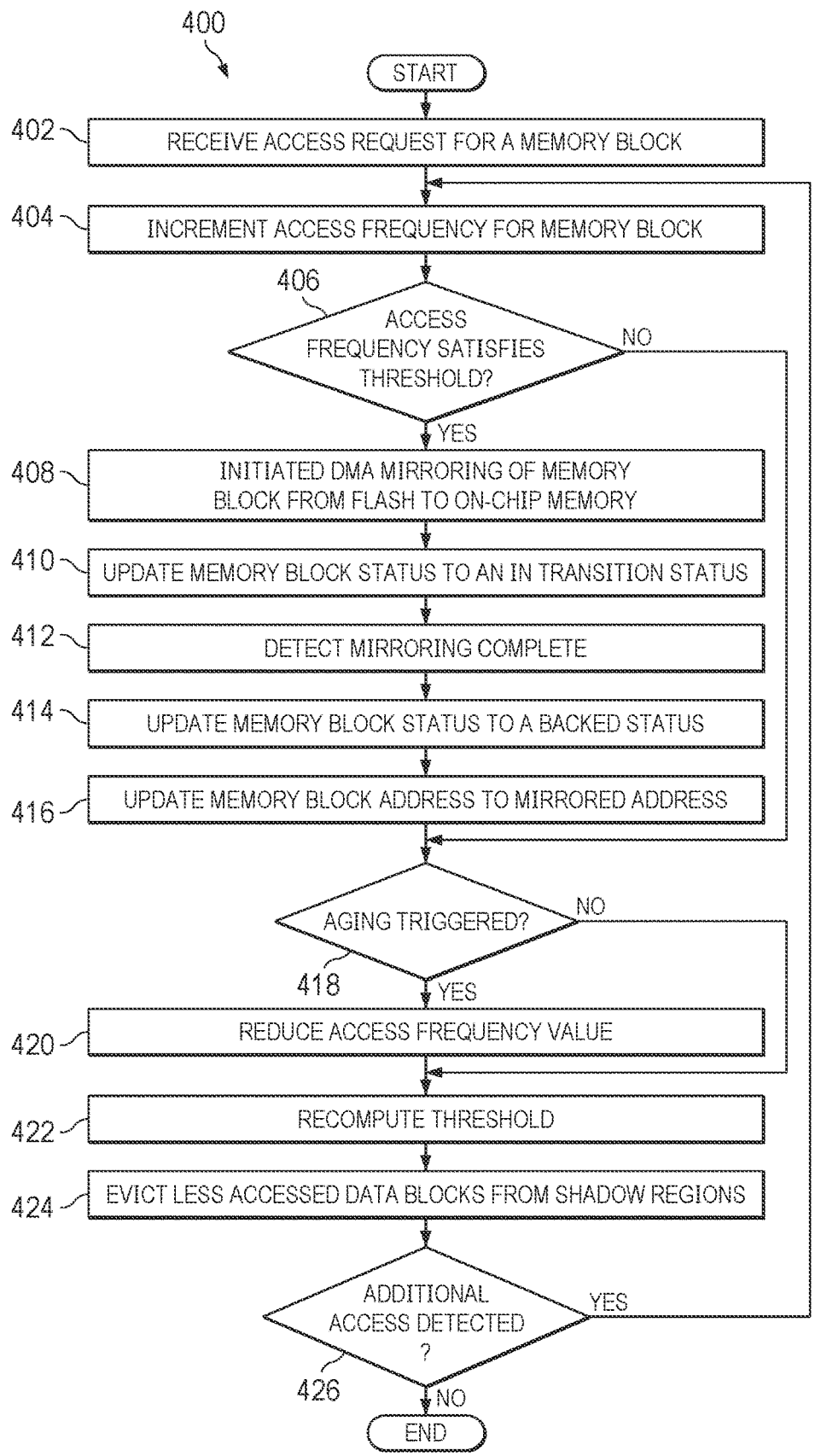
FIG. 4 depicts a flowchart for managing mirrored data in accordance with one or more embodiments.

FIG. 4 depicts a flowchart for managing mirrored data in accordance with one or more embodiments. The flowchart 400 begins at block 402, where the AMMPA receives an access request for a particular memory block. For example, a processor executing computer code stored on the Flash memory may make a call to a particular memory block on the Flash memory. According to one or more embodiments, the size of the memory block can be a fixed size. For example, in some embodiments, the target memory may be tracked at a slice granularity. As such, the access request may be associated with a memory slice associated with the target memory. In some embodiments, the access request may be received by the transaction mapper 202, and a request for an address for the memory block can be sent from the transaction mapper 202 to the transaction tracker 204.

The flowchart continues to block 404 where the transaction tracker 204 increments a value for an access frequency for a corresponding memory block in response to the received access request. The access frequency may include a value of a total count of calls to a particular memory block over time. The access frequency may be determined for a predetermined amount of time. In some embodiments, the access frequency may be a value that is weighted according to recency of access requests, such that a first memory block with older access requests has a lower access frequency value than a second memory block with a same number of access requests where the access requests are more recent.

At block 406, a determination is made as to whether the access frequency satisfies a threshold access frequency. In some embodiments, the threshold access frequency may be a threshold value at which a memory block of the target memory is considered to be a "hot spot" such that the memory block should be mirrored to reduce latency associated with transactions involving the memory block. It should be understood that while the determination as to whether the threshold comparison is triggered is presented in the flowchart after an access request is received (for example, in real time), the determination could be triggered differently. In some embodiments, a deferred approach may be used. For example, an event-based trigger may be used, such as comparing the access frequency for the various memory blocks periodically, such as every N clock cycles, as will be described below with respect to FIG. 5. As another example, the determination may be made based on a triggering condition, such as when a maintained reference counter value hits a predetermined threshold, such as a half-rollover, or certain higher order bits of reference count value toggling. Further, in some embodiments, the threshold access frequency may be defined in various ways. As an example, a flexible ranking algorithm can be used to determine the most frequently access slices of the target memory. As another example, a tempered real time ranking can be utilized, in which an access frequency value is compared when a RefCnt value higher order bits are updated, as will be described below with respect to FIG. 6. Further, as another embodiment, the comparison against the threshold access frequency may occur only when a preliminary threshold count is met. For example, an increment of an access frequency value may only trigger a re-ranking or otherwise comparing against a threshold access frequency if the increment causes the access frequency to satisfy a preliminary threshold count. If it is determined at block 406 that the access frequency value satisfies a threshold value, then the flowchart continues to block 408.

At block 408, a DMA mirroring technique is initiated for the memory block so that a copy of the memory block is made available at a fast memory, such as an on-chip memory. The transaction tracker 204 may trigger a DMA engine to copy the Flash memory block associated with the access frequency that satisfied a threshold to a shadow region of a different memory location. As described above, the DMA engine 206 may pass the transaction request through an access arbitration block 208 such that the AMMPA de-prioritizes DMA mirroring transactions in favor of transactions from the processing core 102 to the target memory 112.

In response to initiating the DMA mirroring transaction, the flowchart continues to block 410, where a status for the memory block is updated in a lookup table managed by the transaction tracker. In some embodiments, each memory block of the target memory that is monitored by the AMMPA may be associated with a particular status, such as tracked (e.g., memory locations for which a shadow copy is not available on another memory device), backed (e.g., memory locations for which a shadow copy is available on another memory device) and in transition (e.g., memory locations for which in the process of being copied to a shadow region of a faster memory device). Because the DMA mirroring functionality is de-prioritized in favor of calls to the target memory 112 by the processor 102, the in transition status indicates that a DMA transfer request is pending. The flowchart continues to block 412 where the DMA transfer request is complete. For example, the DMA engine 206 may transmit a signal to the transaction tracker 204 indicating that the DMA transfer is complete.

In response to receiving an indication that the DMA transfer is complete, the flowchart continues to block 414, where the memory block status is updated to a backed status. Then at block 416, the transaction tracker 204 updates a memory block address to indicate a memory address at the shadow region of the additional memory device at which the memory block is mirrored.

The flowchart continues at block 418 where a determination is made as to whether an aging function is triggered. It should be understood that while the determination as to whether the aging function is triggered is presented in the flowchart after an access request is received (for example, in real time), it should be understood that the determination could be triggered differently. In some embodiments, a deferred approach may be used. For example, a count rollover may occur, saturation may occur, or the like.

For example, the determination may be made periodically, based on clock cycles, and thus may occur regardless of whether an access frequency is found to satisfy a threshold at block 406. In some embodiments, the aging function may be triggered after a periodic time interval. The time interval may be managed, for example, based on a clock hosted by control block 212. If the aging function is triggered, then the flowchart continues to block 420 and the access frequency value is aged.

After the access frequency has been updated due to aging, or if at block 418 aging is not yet triggered, the flowchart 400 continues to block 422. At block 422, the access frequency threshold is recomputed. According to one or more embodiments, the access frequency threshold may be an adaptive value. In some embodiments, the access frequency threshold may be recomputed based on a lowest access frequency value among mirrored memory blocks. In some embodiments, the access frequency threshold determination may be based on a ranking of access frequency values among tracked slices. As such, the flowchart continues at block 424 where less accessed memory blocks are evicted from shadow regions. That is, the mirrored memory blocks in the shadow regions associated with access frequencies that no longer satisfy the recomputed threshold may be cleared so that the shadow regions are made available for other mirrored portions of the XIP Flash.

The flowchart continues at block 426 where a determination is made if additional access to XIP Flash is detected. If additional access to XIP Flash is not detected, then the flowchart concludes. If additional access to XIP Flash is detected, then the flowchart returns to block 404, where the access frequency for the accessed memory block is incremented, and the flowchart proceeds.

Figure 5:
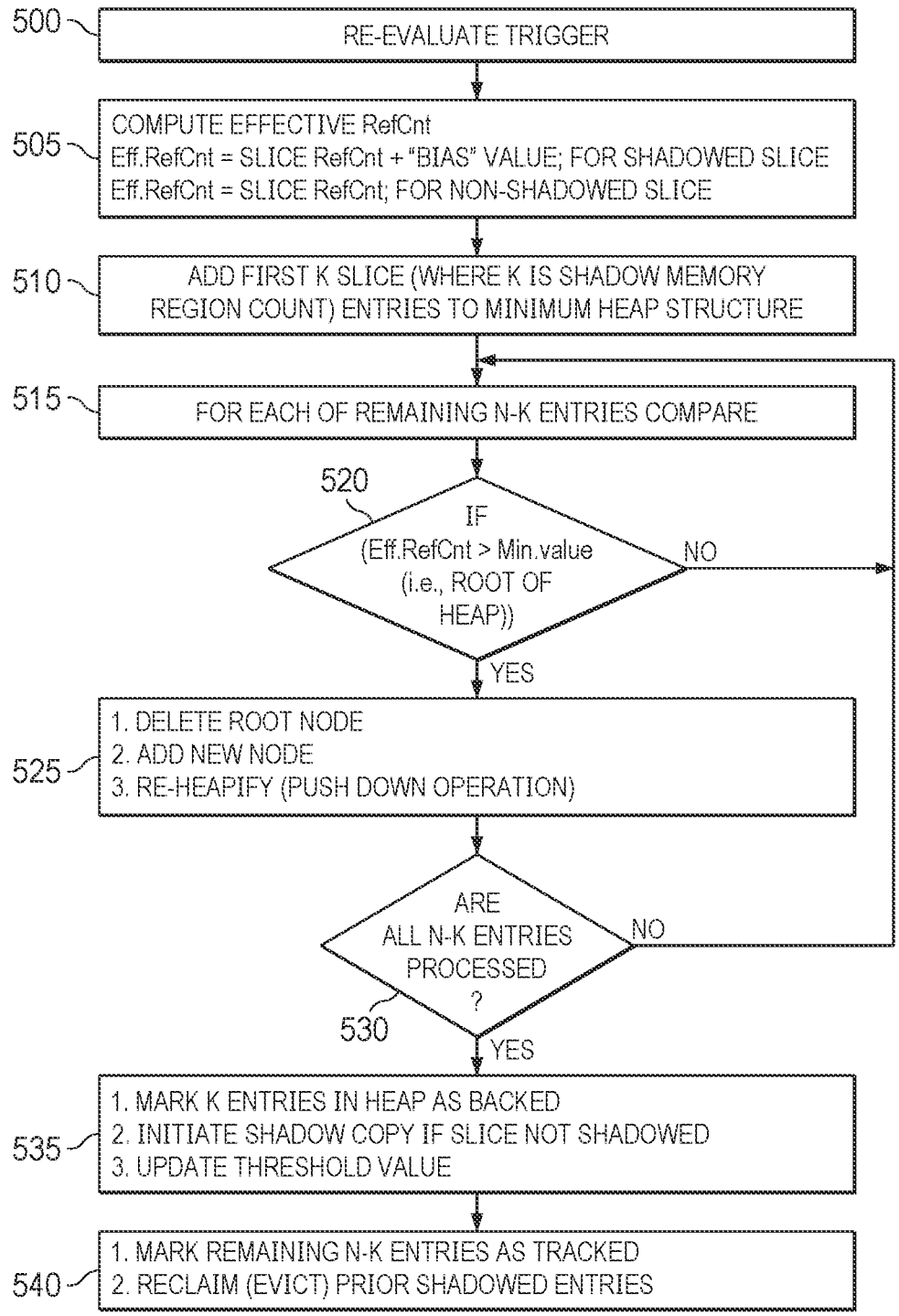
FIG. 5 depicts a flowchart of a deferred ranking algorithm technique, according to one or more embodiments.

FIG. 5 depicts a flowchart of a deferred ranking algorithm technique, according to one or more embodiments, which may be performed by a component of an SoC such as AMMPA 106. In particular, FIG. 5 depicts a technique for ranking tracked target memory locations to determine most frequently accessed locations. In some embodiments, tracked memory locations can be ranked on a deferred basis, such as occasionally, or periodically, to determine memory locations which should be mirrored.

The flowchart begins at 505 where an effective count (RefCnt) is calculated in a manner to provide a bias for shadowed slices. As such, an effective RefCnt value may be the count value associated with a slice or other memory region corresponding to the count if the memory region is not mirrored. In addition, an effective RefCnt value may include the count value for a memory region with an additional bias value for a mirrored, or shadowed, memory region. In some embodiments, the bias value is added to favor slices that are already mirrored. For example, if the accessed slice RefCnt value is slightly higher than the adaptive threshold (which is lowest RefCnt value of mirrored slice), there is overhead of copying a new slice to mirror that needs to be weighed against. Hence, in some example, only if RefCnt is sufficiently larger than threshold (+bias value) is the slice state changed to "Alloc".

The flowchart continues at block 510 where the first K slices (or other memory regions) are added to a heap structure, where K corresponds to a shadow memory region count. At block 515, for the remaining N–K slices, the flowchart proceeds. At block 520, where a determination is made regarding whether an effective RefCnt for a current slice is greater than a minimum value, where the minimum value is less than the value of a root node. If the effective RefCnt for a given memory region is not greater than the minimum value, then the flowchart returns to block 515 for a next memory region to be considered.

Returning to block 520, if it is determined that a current RefCnt for a memory region is greater than a minimum value, then the flowchart continues to block 525. At block 525, a current root node is deleted, and the current evaluated node is replaced into the heap.

A block 530, a determination is made regarding whether any additional entries are unprocessed. If so, the flowchart continues at block 515 and the next memory region is considered. If, at block 530, a determination is made that all entries are processed, then the flowchart continues at block 535. The identified entries (memory regions) are marked as backed, and a shadow copy is initiated for the memory regions for those which were not previously mirrored. In addition, an updated threshold value is obtained based on the RefCnt for the mirrored regions.

The flowchart concludes at block 540 where the remaining entries are labeled as tracked entries, meaning the entries are not backed. In addition, any previously shadowed regions now identified as backed regions may be evicted from shadow memory.

Figure 6:
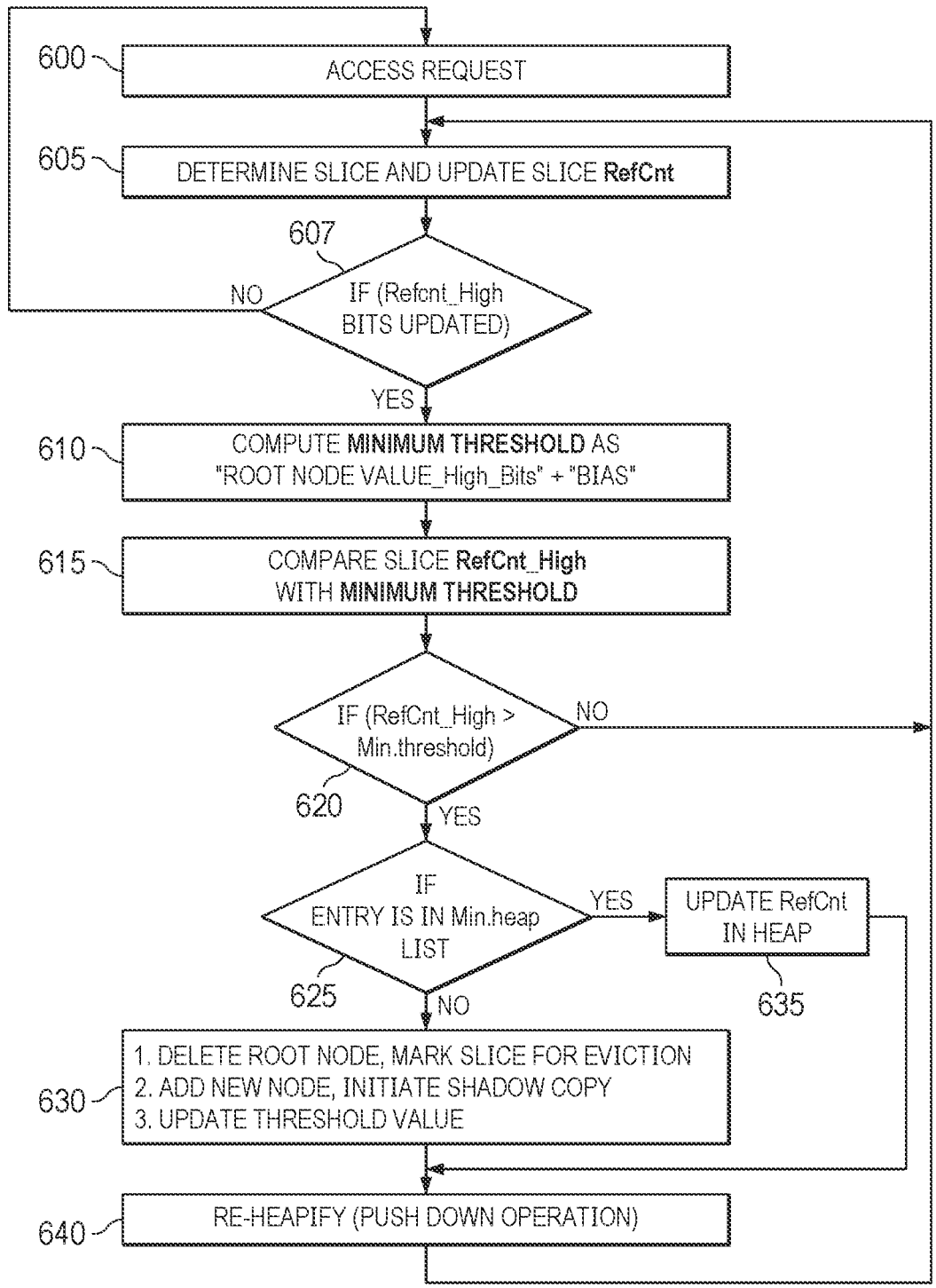
FIG. 6 depicts a flowchart of a tempered real time ranking algorithm technique, according to one or more embodiments.

FIG. 6 depicts a flowchart of a tempered real time ranking algorithm technique, according to one or more embodiments, which may be performed by a component of an SoC such as AMMPA 106. In particular, FIG. 6 depicts a technique for ranking tracked target memory locations to determine most frequently accessed locations. In some embodiments, tracked memory locations can be ranked in real time, for example based on an update to an access count value. As will be discussed, in some embodiments, the evaluation and/or ranking of tracked memory locations may be skipped if only lower bits of RefCnt are updated.

The flowchart begins at 600, where an access request is received. The access request may be received when a memory call is made to a backed or tracked memory location, for example. The flowchart continues at block 605 where the access value (RefCnt) associated with the accessed memory location is updated.

At block 607, a determination is made as to whether high bits of the RefCnt value are updated. In some embodiments, the ranking algorithm is run only when the higher order bits of the RefCnt value are updated. As such, the ranking algorithm may only consider the higher order bits of RefCnt for comparison, whereas lower bits may be ignored. In these embodiments, if no high bits are updated, then the flowchart returns to 600 until another access request is received.

If, at block 607, a determination is made that the high bits of the RefCnt value are updated, then the flowchart continues at block 610, where a minimum threshold is computed based on a root node higher order bit value with an added bias value. According to some embodiments, utilizing an added bias value allows bias to extent toward existing shadow copy entries. Then, at block 615, the RefCnt_High bits (the high bits of the RefCnt value) for the currently evaluated memory region is compared with the computed minimum threshold. If, at block 620, the RefCnt_High is greater than the minimum threshold, then no further action is taken and the flowchart returns to 600 until another access request is received.

Returning to block 620, if the RefCnt_High is greater than the minimum threshold, then the flowchart continues to block 625, and a determination is made if the entry is in the minimum heap list. If the entry is in the list, then the flowchart continues to block 635, the RefCnt is updated in an index in the heap.

Returning to block 625, if the entry is not in the list, then the flowchart continues to block 630. The system deletes the current root node, and marks the root node for eviction. The new node is added to the heap, and a shadow copy is initiated. In addition, the threshold value may be updated to the new root value. Then, the flowchart continues to block 640, where the heap is reheapified based on the updated values, and the flowchart returns to block 600 until a next access request is received.

Figure 7:
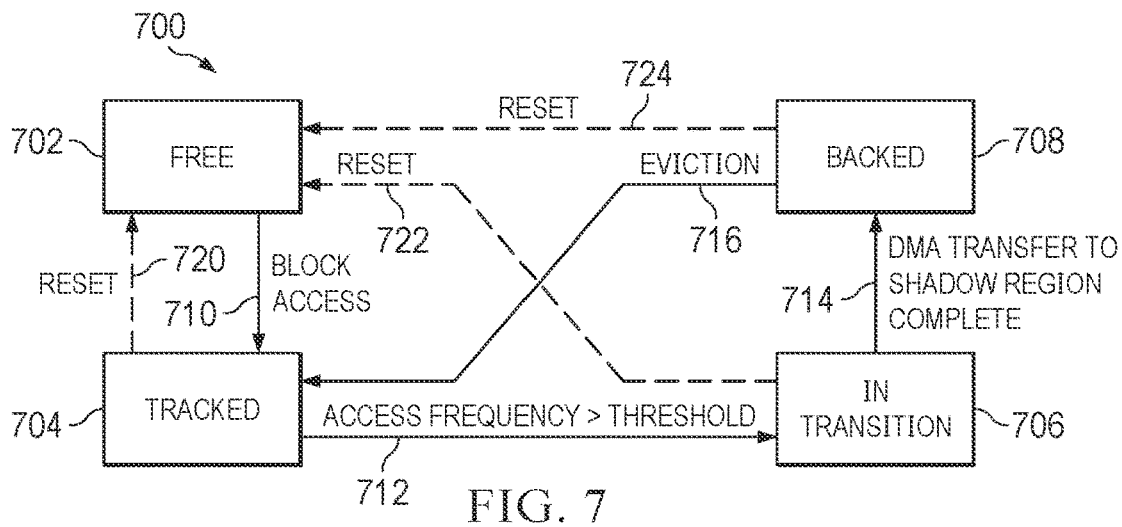
FIG. 7 depicts a state machine used for managing mirrored data in accordance with one or more embodiments.

FIG. 7 depicts a state machine 700 used for managing mirrored data in accordance with one or more embodiments. As shown, the state machine shows various states for each memory block in the XIP Flash. For purposes of this example, the state machine will be described in relation to a single memory block. However, it should be understood that multiple memory blocks can be tracked and mirrored by the state machine 700 as shown.

Initially, a memory block will be in a free state, as shown at 702. That is, prior to any transaction requests being directed toward the memory block, the memory block will be considered in a free state. At 710, the memory block is accessed, causing the transaction tracker 204 to assign a tracked state to the memory block. For example, a transaction tracker may begin incrementing an access frequency value based on the block access, thereby tracking the memory block. Then at 712, when an access frequency for the memory block surpasses a threshold value, the transaction tracker 204 triggers the DMA mirroring of the memory block from the XIP flash to the on-chip memory. As such, the transaction tracker 204 assigns an in-transition status 706 to the memory block to indicate the memory block has been allocated to a shadow region and a DMA transfer from the memory block of the XIP Flash to the shadow region of the on-chip memory is pending. Upon completion of the DMA transfer to the shadow region, as shown at 714, then the transaction tracker 204 assigns a backed state 708, indicating that the memory block is associated with a mirrored version in the shadow region. As shown at 716, the backed memory block may be evicted from the shadow region, for example, if the access frequency threshold is modified such that an access frequency value for the memory block no longer satisfies the threshold. Thus, the mirrored version in the shadow region may be cleared, and the transaction tracker 204 returns to the tracked state 704.

In some embodiments, the shadow regions may occasionally or periodically be reset. Thus, at 720, a memory block associated with a tracked state 704 will return to a free state 702. Similarly, at 722, a memory block associated with an in-transition state 706 will revert to a free state 702, and at 724, a memory block associated with a backed state 708 will revert to a free state 702.

The selection and timing for mirroring memory blocks from the target memory may occur in various ways. In a first example, in a flexible ranking algorithm approach, a ranking scheme may be used to determine the most frequently accessed slices from the target memory. As such, the threshold access frequency value may be adaptive based on the ranking scheme and available memory for mirroring. The ranking may occur in real time, such as on every slice access, or using a deferred approach, where access frequency values are aggregated and re-ranked based on a triggering event. In a second example, a deferred approach may be used for slice ranking. The deferred approach may include deferring the ranking of slices such that the slices are re-ranked periodically, such as after N clock cycles, or upon a saturation event. In a third example, a tempered real time ranking may be used. The set of memory slices having a mirrored copy are ranked. The access frequency value for the lowest ranked memory slice may be set as the threshold access frequency. As such, upon incrementing an access frequency value for a particular slice, if that updated value is less than the threshold access frequency, then it can be determined that the memory slice associated with the incremented value should not be mirrored. By contrast, if the updated value is greater than the threshold access frequency, then the currently ranked memory slices can be re-ranked to include the memory slice associated with the incremented value. According to some embodiments, once a set of memory slices are ranked, slices in the allocated state with a rank less than the threshold will be evicted and oved to a tracked state. Tracked slices with a rank greater than the threshold value will transition into an allocated state.

Figure 8:
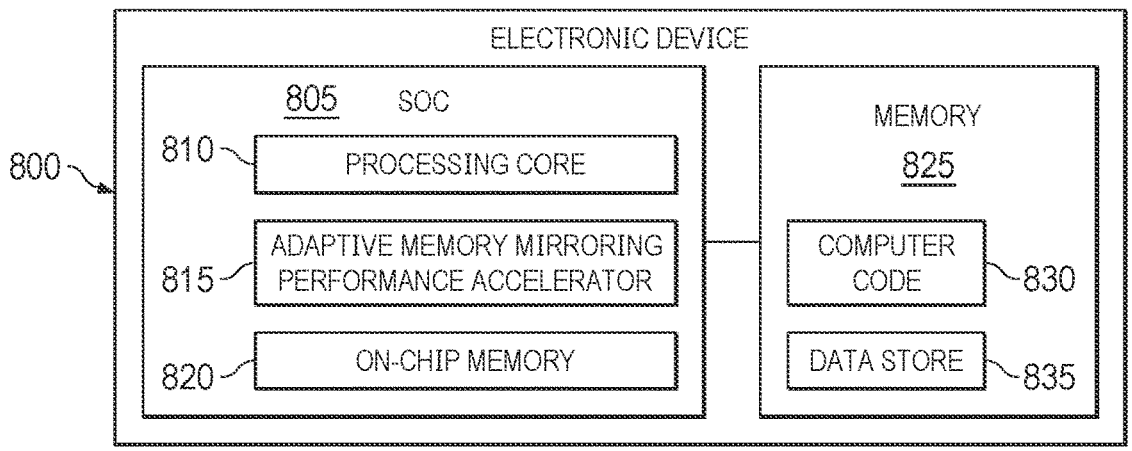
FIG. 8 depicts an electronic device comprising a computer readable medium on which techniques described herein can be implemented in accordance with one or more embodiments.

FIG. 8 depicts an electronic device 800 comprising a computer readable medium on which techniques described herein can be implemented, in accordance with one or more embodiments. Electronic device 800 illustrates that memory 825 may be operatively and communicatively coupled to SOC 805. Memory 825 may be a non-transitory computer readable storage medium configured to store various types of data. For example, memory 825 may include one or more non-volatile storage devices, such as flash memory and/or any other type memory designed to enable direct access from one or more processing cores. The memory 825 may be used to store computer readable program code 830 that can be loaded into the on-chip memory 820, such as RAM, when such programs are executed by processing core 810. According to some embodiments, memory 825 may also include a data store 835 which may store data, for example, for use by computer code 830. Electronic device 800 may also include input and/or output devices not shown, examples of which include sensors, cameras, human input devices, such as mouse, keyboard, touchscreen, monitors, display screen, tactile or motion generators, speakers, lights, etc.

In some embodiments, electronic device 800 may include an adaptive performance accelerator 815 as part of the SOC 805. The adaptive performance accelerator 815 may be a hardware accelerator configured to perform specialized functions, for example, to intercept transaction requests from the processing core 810 and remap requests directed to memory 825 to alternative shadow regions on on-chip memory 820. In some embodiments, adaptive performance accelerator 815 is configured to maintain, for each memory block in memory 825, an access frequency value. In addition, the adaptive performance accelerator 815 may maintain a threshold value at which the memory block from memory 825 should be copied to a shadow region in on-chip memory 820.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), a digital signal processor (DSP), etc. The software that executes the techniques may be initially stored in a computer readable medium, such as a file, memory, or any other computer readable storage device, and then loaded and executed in the processor. In some cases, the software may also be sold in a computer program product, which includes the computer readable medium and packaging materials for the computer readable medium. In some cases, the software instructions may be distributed via removable computer readable media (e.g., floppy disk, optical disk, flash memory, universal serial bus (USB) key) via a transmission path from computer readable media on another digital system, etc.

What is claimed is:

1. A memory controller comprising:
a transaction tracker configured to:
maintain a location mapping for each of a plurality of memory blocks, wherein each of the location mapping references at least one of a first memory and a second memory,
wherein the first memory is configured to store a copy of each memory block of the plurality of memory blocks stored at the second memory for which an access frequency of the memory block satisfies an access threshold for the memory block, in which the access frequency of the memory block is weighted more heavily for access requests of the memory block within a subset of a time in which access requests for the first memory block have been made; and
a transaction mapper configured to:
receive a request from a processor core for access to a first memory block of the plurality of memory blocks,
obtain, from the transaction tracker, a mapped address for the first memory block, and
remap the request to the mapped address.

2. The memory controller of claim 1, wherein first memory is associated with a lower latency than the second memory.

3. The memory controller of claim 1, wherein the transaction tracker is further configured to:
track the access frequency for each of the plurality of memory blocks; and
initiate copying of a second memory block of the plurality of memory blocks from the second memory to the first memory responsive to determining that the access frequency of the second memory block satisfies the access threshold for the second memory block.

4. The memory controller of claim 3, wherein the transaction tracker is further configured to update the access threshold for the second memory block based on access frequencies of memory blocks copied into the first memory.

5. The memory controller of claim 3, further comprising:
a control clock configured to host a timer logic by which the set time is determined, the timer logic further configured to trigger age-based weighting of the access frequency for each of the plurality of memory blocks.

6. The memory controller of claim 1, wherein at least one of the first memory and the second memory is associated with a second memory controller.

7. The memory controller of claim 1, further comprising:
an arbitration block configured to schedule access to at least one of the first memory and second memory for read requests from the processor core and initiate copying.

8. A system-on-chip comprising:
one or more compute cores;
a first memory configured to store copies of content from a second memory;
an accelerator block configured to:
    track an access frequency for each of a plurality of memory blocks on a second memory with higher latency than the first memory, wherein the access frequency for each of the plurality of memory blocks is weighted more heavily for access requests of the memory block within a subset of a time in which access requests for the memory block have been made;
    determine that the access frequency for a first memory block of the plurality of memory blocks satisfies an access threshold; and
    responsive to determining that the access frequency for the first memory block satisfies the access threshold, initiate copying of the first memory block from the second memory to the first memory; and
a transaction tracker configured to:
    maintain a location mapping referencing at least the second memory for each of a plurality of memory blocks, wherein the location mapping for the first memory block references the first memory and the second memory.

9. The system-on-chip of claim 8, further comprising:
a transaction mapper configured to:
    receive a request from a processor core for access to the first memory block,
    obtain, from the transaction tracker, an address at the second memory for the first memory block, and
    remap the address to the first memory.

10. The system-on-chip of claim 9, further comprising a transaction tracker configured to update the access threshold for the first memory block based on access frequencies of memory blocks copied into the first memory.

11. The system-on-chip of claim 8, further comprising:
a control clock configured to host a timer logic by which the set time is determined, the timer logic further configured to trigger age-based weighting of the access frequency for each of the plurality of memory blocks.

12. The system-on-chip of claim 11, wherein the access threshold for the first memory block is adjusted based on access frequencies of memory blocks copied into the first memory.

13. A method comprising:
determining that an access frequency of a memory block of a plurality of memory blocks, satisfies an access threshold for the memory block, wherein the access frequency of the memory block is weighted more heavily for access requests of the memory block within a subset of a time in which access requests for the memory block have been made;
copying the memory block from a first memory to a second memory and remapping a destination address of the memory block to the second memory in response to determining that the access frequency of the memory block satisfies the access threshold for the memory block, the first memory having a higher latency than the second memory;
receiving, from a processor core of a circuit, a read request for the memory block;
determining that the destination address for the first memory block is remapped to the second memory; and
initiating the read request to the remapped destination address.

14. The method of claim 13, wherein the determining and copying are performed prior to receiving the read request.

15. The method of claim 14, wherein determining that the access frequency for the memory block satisfies the access threshold for the memory block comprises:
determining that a high order bit value of the access frequency is updated;
in accordance with a determination that the high order bit value of the access frequency is updated, compute the access threshold based on a root node higher order bit value and an added bias value.

16. The method of claim 14, further comprising initiating the read request by:
scheduling the read request by an arbitration block,
wherein the arbitration block is configured to prioritize access requests from a processing core over access requests for copying a memory block.

17. The method of claim 16, further comprising:
receiving, from the processor core, a second read request for a second memory block at a third address on a memory external to the circuit;
determining that the second memory block is not copied in the second memory; and
responsive to determining that the second block is not copied, passing the read request to the arbitration block.

18. The method of claim 13, wherein the access frequency of the memory block is adjusted upon completing of a timer interval corresponding to the set time.

19. The method of claim 14, further comprising:
adding tracking data for a first subset of tracked memory blocks into a heap structure;
comparing an access frequency for each of a remaining subset of the tracked memory blocks to access frequencies for the first subset of tracked memory blocks;
iteratively adding tracking data for a tracked memory block into the heap structure based on the comparison, wherein tracking data for a particular memory block is evicted in accordance with an added tracking data for the tracked memory block; and
assigning a tracked label to the evicted memory block.

* * * * *